United States Patent Office 3,525,700
Patented Aug. 25, 1970

3,525,700
TYPE O CRYSTALLINE MATERIAL
Laurence R. Steenberg, Chicago, and Edward J. Bicek, Mount Prospect, Ill., assignors to Universal Oil Products Company, Des Plaines, Ill., a corporation of Delaware
No Drawing. Filed Feb. 13, 1967, Ser. No. 615,371
Int. Cl. B01j *11/40;* C01b *33/28*
U.S. Cl. 252—455
11 Claims

ABSTRACT OF THE DISCLOSURE

A synthetic composition having a host solid crystalline almuinosilicate containing silicon centered and aluminum centered tetrahedra and arranged in three dimensional cages and having crystallographically significant but non-structural silica inclusions within the cage structure. The invention is also directed to the manufacture of the composition, its conversion to a suitable hydrocracking catalyst and its utilization as a hydrocracking catalyst in a hydrocracking process.

---

This invention relates to a novel synthetic composition comprising a host solid crystalline aluminosilicate having three dimensional cages and crystallographically significant silica inclusions within the cage structure. More specifically this invention relates to a composition comprising a host faujasite having three dimensional cages and having crystallographically significant silica contained within the cage structure. This invention also relates to the manufacture of said specific composition. This invention further relates to the conversion of said specific composition into a binderless catalyst support suitable for use as a catalyst in a hydrocracking process. This invention additionally relates to a novel hydrocracking catalyst. Furthermore, this invention relates to a novel hydrocracking process.

In one of its embodiments, this invention relates to a synthetic composition comprising a host solid crystalline aluminosilicate having three dimensional cages and crystallographically significant periodically dispersed solid silica contained within the cages having the following molar ratio chemical composition:

$$0.9 \pm 0.3 \ M_2O/n : Al_2O_3 : xSiO_2 : yH_2O$$

wherein M is a cation, n is the valence of M, x is a number from about 4 to about 11 and y is a number less than about 5.

In another of its embodiments this invention relates to a substantially binderless hydrocracking catalyst which comprises: a support comprising a host solid crystalline aluminosilicate having three dimensional cages and crystallographically significant solid silica contained within the cages; and a Group VIII metal or metal compound deposited on said support.

In still another of its embodiments this invention relates to a process for the hydrocracking of hydrocarbons which comprises contacting said hydrocarbons along with hydrogen with a solid hydrocracking catalyst comprising a support containing a host solid crystalline faujasite having three dimensional cages and cations selected from the group consisting of sodium, calcium, magnesium and hydrogen associated with the aluminum tetrahedra and having crystallographically significant solid silica contained within the cages and a Group VIII metal or metal compound deposited on said support under hydrocracking conditions.

It is an object of this invention to provide an improved process and catalyst for hydrocarbon conversion.

It is another object of this invention to provide an improved process and catalyst for the hydrocracking of hydrocarbons.

It is another object of this invention to increase the gasoline yield from a hydrocracking process.

It is a further object of this invention to modify the catalytic properties of faujasite as a catalyst support in the hydrocracking hydrocarbons.

It is still another object of this invention to crystallographically disperse solid silica within the three dimensional cage structure of a crystalline aluminosilicate and thereby improve its catalytic properties when utilized as a catalyst support.

These and other objects will become more apparent especially in the light of the following detailed discussion.

Crystalline aluminosilicates have become widely important in the field of catalysis especially when employed as catalysts in hydrocarbon conversion reactions. Numerous composition patents have issued claiming various types of synthetic crystalline aluminosilicates as for example U.S. Pat. Nos. 2,882,243, 2,882,244, 2,991,151, 2,995,423, 3,010,789, 3,130,007, 3,123,441, and 3,248,170. In all cases these materials are composed of tetrahedra of oxygen atoms with either a silicon atom or an aluminum atom at its center. A silicon atom has a +4 valence and is bound to one of the two valence bonds of each of the four oxygen atoms in the tetrahedral configuration. The other valence bond of the oxygen atom is linked to a neighboring silicon or aluminum atom. The aluminum has a +3 valence and has a cation of +1 valence or portion of a multivalence cation nearby to satisfy the electrical requirement of the tetrahedral configuration. Thus, the structure may be thought of as a series of aluminum or silicon centered tetrahedra ($SiO_4$ or $AlO_4$) arranged in an orderly manner and cross linked by the common sharing of oxygen atoms in three dimensions resulting in an overall mole ration of $O/(Al+Si) = 2$. Because of the orderly arrangement of the tetrahedra, uniform three dimensional cages or pores exist and the material will diffract X-ray beams to give a distinct diffraction pattern. Therefore, when one speaks of a material being crystalline this means that the material is arranged in an orderly 3-dimensional manner such that the position of the atoms are repeated and therefore when X-ray beams pass therethrough the orderly arrangement of atoms will diffract and reinforce the beams in a particular pattern. A different orderly arrangement of atoms will result in a different albeit distinct diffraction pattern. It is apparent that when atoms are arranged in an orderly and repetitious fashion they become crystallographically significant, that is will diffract the X-ray beams in a distinct manner. In contrast, amorphous material will not give sharp diffraction patterns but will give only a few broad weak diffraction haloes. It has been found that by the method of this invention silica can be deposited interstitially within the three dimensional cage structure of a host crystalline aluminosilicate in a three dimensional and periodic manner.

Amorphous silica will not produce a distinct diffraction pattern and when crystalline aluminosilicate is dispersed in an amorphous silica matrix, there will be no significant selective alternation of the diffraction as in the case of the present composition. It has further been found that as a result of the crystallographically significant deposition of solid silica within the cage structure of a host faujasite aluminosilicate the catalytic properties thereof are unexpectedly enhanced especially in the hydrocracking reaction. This new composition having a faujastite host will be hereinafter referred to as Type O to briefly describe this material and distinguish it from other synthetic aluminosilicate materials. Other crystalline aluminosilicates may also be employed as hosts such as mordenite, Type A, phillipsite, chabazite, Type X, etc.

Type O is prepared by the formation of faujasite particles from an aqueous solution containing excess sodium silicate, separation of the faujasite particles and a portion of the excess sodium silicate from the aqueous solution, slurrying of the faujasite particles and excess sodium silicate with water and spray drying of the slurry in an atmosphere containing carbon dioxide. Type O may also be prepared by slurrying pure faujasite with a dilute solution of an alkali metal silicate and preferably sodium silicate and spray drying or otherwise contacting the slurry with a carbon dioxide containing atmosphere. Although the exact mechanism is not understood, it is thought that the sodium silicate which is dispersed in the host faujasite reacts with the carbon dioxide to precipitate solid silica and form sodium carbonate. The water soluble sodium carbonate is subsequently removed by water washing. It is also possible that the geometric relationship of the host faujasite and the atomic charges thereof are in part responsible for the periodic and regular deposition of the solid silica at equivalent crystallographic sites within the host faujasite cage structure. It has been found that the X-ray diffraction pattern of the host faujasite, after the crystallographically significant deposition of solid silica within the cage structure, has been altered since this results in definite and selective alterations in the relative intensities of the X-ray diffraction pattern proving that the solid silica is present in a regular periodic distribution throughout the host faujasite. A complete mathematical and crystallographic interpretation of these intensity changes would require the assignment of a structure different from that of the host faujasite or any of its ion exchanged derivatives. The X-ray diffraction patterns for pure sodium faujasite and a sodium Type O having a $SiO_2/Al_2O_3$ mole ratio of about 6.1 are set forth in columns 1 and 2 respectively of Table 1. Column 3 shows the percentage change in line intensity of Type O over faujasite.

TABLE I

| Column material X-ray diffraction pattern d value | 1 Faujasite intensity | 2 Type O intensity | 3 Type O as percent of Faujasite |
| --- | --- | --- | --- |
| 14.3 | 97 | 60 | 62 |
| 8.75 | 19 | 16 | 84 |
| 7.51 | 12 | 14 | 116 |
| 5.71 | 44 | 36 | 82 |
| 4.78 | 18 | 12 | 67 |
| 4.39 | 30 | 20 | 67 |
| 3.79 | 43 | 37 | 86 |
| 3.32 | 31 | 22 | 71 |
| 2.87 | 40 | 27 | 67 |

It should be noted that all of the X-ray diffraction pattern lines are shifted in an individual and selective manner, one line having an intensity as much as 116% of that of faujasite and other line having an intensity only 62% of that of faujasite. This clearly shows the definite and selective alteration in relative intensity of the X-ray diffraction lines and means that the deposited silica is crystallographically significant.

Type O is readily prepared simultaneous with the preparation of the host faujasite. A preferable method of preparation employs the use of a reactive aluminate solution and a silica slurry along with a sodium hydroxide solution. More specifically, a solid sodium hydroxide is dissolved in water and solid sodium aluminate is dissolved therein. A slurry of silica in water is prepared and the caustic alumina solution is added thereto. The suitable and preparable mole ratio of these reactants are tabulated below.

| | Suitable | Preferred |
| --- | --- | --- |
| $SiO_2/Al_2O_3$ | 6-20 | 8-12 |
| $Na_2O/SiO_2$ | 0.3-0.7 | 0.4-0.45 |
| $H_2O/Na_2O$ | 23-60 | 35-45 |

The reactants are allowed to mix with agitation at room temperature and are then heated to an elevated temperature close to the boiling point of the mixture. When carried out essentially at atmospheric pressures, suitable elevated temperatures are from about 90 to about 98° C. The reactants are aged quiescently at said elevated temperature whereupon faujasite particles are formed. The mixture is cooled and the solids are separated from the mother liquor. It is important that some residual mother liquor which contains sodium silicate be left in the solids and therefore the manner of separation is important. The solids should not be water washed since this may remove all the sodium silicate from the solids. Preferably, the solids are separated by decantation, basket centrifuge or by the use of a rotary drum filter. The resulting solids are reslurried in water to a solids concentration of from about 15% to about 20% and spray dried into a hot chamber of moving gas maintained at a temperature of from about 500° F. to about 950° F. It is important that the atmosphere maintained within the hot chamber contain carbon dioxide gas. This is readily attained simply by employing a direct fired heater such that the combustion products pass through the hot chamber. The spray drying is carried out by pressuring the uniform slurry of solids, sodium silicate and water through an orifice and into the hot chamber. Preferably, the spray dried particles are dried to a moisture content of from about 12 to about 18 weight percent. The particles have a particle size distribution similar to fluid cracking catalyst or somewhat larger. The spray dried particles are thereafter water washed to remove any water soluble components such as sodium carbonate and sodium silicate. The water washed particles are dried to produce Type O powder.

There are several variables which will affect the final $SiO_2/Al_2O_3$ mole ratio of the Type O material. This final ratio will vary from about 4.0 to about 11.0 and preferably from about 4.5 to about 7.0. Especially preferably are overall final ratios of from about 4.7 to about 6.2. The first variable is the $SiO_2/Al_2O_3$ ratio of the host faujasite structure since this ratio can vary from about 3.0 to about 6.0. A second variable is the molar ratio of crystallographically significant silica, expressed as moles of $SiO_2$, per supercage of faujasite. This is in turn a function of the concentration of sodium silicate solution within the host faujasite when contacting the carbon dioxide. Suitably, the moles of $SiO_2$ per faujasite supercage is from about 1 to about 10 and preferably from about 2 to about 5. It is expected that the amount of periodically dispersed and crystallographically significant silica will affect the X-ray diffraction pattern of the Type O somewhat.

The Type O powder is readily aggregated into substantially binderless macroparticles of useful size for fixed bed contacting operations such as catalytic reactor and adsorption beds. The Type O powder is blended with a temporary binder such as polyvinyl alcohol of Sterotex quantities of from about 1 up to about 10% by weight binder and preferably about 5 weight percent. The temporary binder is useful as a lubricant when aggregating the particles by pilling techniques. The blended powder is formed into macroparticles of desired size, shape and strength preferably by a pilling operation. Preferably, the pills are formed having a crushing strength of from about 6 to about 10 pounds. The pills are thereupon contacted with an oxygen containing gas such as air at elevated temperatures. It is expected that most of the temporary binder will be burned out leaving substantially binderless macroparticles of Type O. By the word binderless, we means that no extraneous binder has been added other than the small amount of temporary binder and it is thought that this temporary binder is substantially completely burned out. The temperatures required for this burning out or calcining operation are above about 750° F. and below temperatures which will substantially injure the host faujasite structure. Preferable calcination temperatures are from about 1000° F. to about 1100° F.

The resulting pilled, calcined substantially binderless Type O macroparticles are readily converted into an enhanced catalyst support by suitable ion exchange techniques. The pilled Type O is catalytically activated by converting the sodium form of Type O either to the polyvalent form, the hydrogen form, the so-called decationized form or mixtures thereof. A preferable polyvalent form employs the ion exchange of divalent cations such as calcium, magnesium, etc. for a substantial amount of the sodium cations. The hydrogen form is prepared by ion exchanging the sodium cations with ammonium cation until at least a substantial portion of the original cation is removed followed by thermal treatment of the ion exchanged particles at temperatures of from about 100° C. up to about 350° C. to decompose the ammonium ions. Likewise, a mixed form is prepared by combining these steps, preferably the divalent ion exchange preceeding the ammonium ion exchanged. The ion exchange is physically carried out by contacting the pilled Type O macroparticles with one or more aqueous solutions containing the desired cations. After the pilled Type O macroparticles have been activated it may be preferable to introduce at least one more catalytic ingredient thereto. In some applications it is preferable to add a Group VIII metal or metal compound to the activated form of the pilled Type O macroparticles. Especially preferred are metals selected from the group consisting of platinum, palladium, nickel and compounds thereof. In some instances it may also be desired to add other transition metals such as Group VI, rare earths, etc. to the pilled Type O macroparticles in order to alter or modify the catalytic properties. The Group VIII metals are added to the activated pilled Type O macroparticles by techniques such as impregnation or ion exchange. Preferably, the Group VIII metal concentration on the macroparticles is from about 0.05 up to about 3 weight percent for noble metals such as platinum and palladium and from about 0.5 up to about 20 weight percent for non-noble metals such as nickel. These metals may exist in the elemental state or chemically combined such as the oxides or sulfides. These Group VIII metal containing binderless pilled Type O catalyst are preferable catalysts in promoting hydrocarbon conversion reactions especially those involving the so-called carbonium ion mechanism such as isomerization, hydrocracking, etc. These catalysts are also suitably employed in many reactions involving hydrocarbons such as alkylation, reforming, hydrodealkylation, cracking, polymerization, etc.

An especially preferable catalyst for use in the hydrocracking reaction comprises a mixed divalent cation hydrogen form Type O macroparticle support having nickel thereon in concentrations of from about 3 to about 8 weight percent. Preferable hydrocracking processing conditions comprise liquid hourly space velocity (LHSV) of from about 0.3 up to about 10, pressures of from about 750 p.s.i.g. up to about 2600 p.s.i.g., temperatures of from about 400° F. up to about 900° F. and hydrogen to charge stock ratios of from about 3.000 up to about 50,000 standard cubic feet per barrel (s.c.f./bbl.). Suitable charge stocks comprise heavier petroleum fractions such as gas oils, cycle oils, middle distillates, kerosenes, coker oils, shale oil, tar sand oil, and in some cases even naphthas. The hydrocracking process is employed to convert these charge stocks to lower boiling range material and to remove contaminants therefrom. For example, the hydrocracking process is suitable to convert gas oils into gasoline and/or middle distillates. It has surprisingly been found that the above described preferable catalyst using the Type O support gives superior hydrocracking results than does a similar catalyst deposited on a "pure" faujasite support.

The following examples are presented to further illustrate the present invention.

EXAMPLE I

An aqueous slurry of silica and a solution of sodium aluminate and sodium hydroxide were prepared. The slurry and solutions were mixed together to give a mixture having the following mole ratios:

$SiO_2/Al_2O_3 = 10$; $Na_2O/SiO_2 = 0.41$ and $H_2O/Na_2O = 40$

The mixture was agitated at a temperature of about 100° F. for about 20 hours. The mixture was then heated to a temperature of about 203° F. and aged quiescently for about 48 hours at about 203° F. The mixture was then cooled to about 100° F. and the solids were separated from the mother liquor on a rotary drum filter.

A first portion of the filter cake from the rotary drum filter containing residual mother liquor was reslurried in water to produce an 18% solids slurry as calculated from the difference between 100% and the percent loss on ignition. This material was spray dried through a nozzle atomizer and into a hot zone full of moving hot air. The temperature throughout the hot zone chamber varies from about 500° F. to about 850° F. The hot zone chamber was heated by a direct fired burner which produces carbon dioxide in the chamber atmosphere. The conditions in the spray drying apparatus were adjusted to reduce the moisture content of the atomized spray dried particles to about 15%. The spray dried particles were then water washed and dried to produce Type O powder. The Type O powder was blended with 5 pounds of polyvinyl alcohol per hundred pounds of powder. The blended material was pilled to produce ⅛ inch pills of 6–10 pound crushing strength. The pills were then calcined in air at about 1100° F.

The calcined pills were prewet with water and ion exchanged with a calcium chloride solution at 203° F. The pills were then water washed and ion exchanged with an ammonium chloride solution. These pills were then water washed until chloride ion free and dried at 225° F. The ion exchanged pills were impregnated with a nickel nitrate solution using a dish evaporation technique to produce a catalyst containing 5 weight percent nickel. The impregnated pills were oxidized at 900° F. to produce a finished catalyst, hereinafter referred to as Catalyst A.

A second catalyst, called Catalyst B, was prepared in the same manner as Catalyst A except that the filter cake from the rotary drum is repeatedly water washed until there is essentially no residual sodium silicate in the filter cake. This thoroughly water washed material was then converted into a binderless pilled catalyst support in the same manner as described above for Catalyst A. This catalyst support was shown by X-ray analysis to consist essentially of pure faujasite. The support is ion exchanged and impregnated in the same manner as Catalyst A to produce a second catalyst, hereinafter referred to as Catalyst B having 5% nickel thereon.

EXAMPLE II

Catalyst A was loaded into a second stage reactor of a two stage hydrocracking pilot plant. The first stage reactor was loaded with a nickel-molybdenum catalyst deposited on a silica-alumina support. The function of the first stage reactor is primarily to reduce the contaminant content of the charge stock especially the nitrogen content and held to maintain catalyst stability in the second stage. The plant is arranged such that the total effluent from the first stage is directly sent into the second stage reactor with no intervening purification. The function of the second stage reactor is primarily to hydrocrack the first stage effluent into the desired boiling point range. The catalyst in both stages were pre-reduced and pre-sulfided prior to the introduction of charge stock.

A blend of diesel oil and cycle oil was utilized as the charge stock. This charge stock had an °API gravity (@60° F.) of about 28.3, an initial boiling point of about 300° F., a 5% boiling point of about 385° F., a 50% boiling point of 509° F. and an end point of about 660° F. The charge stock had a sulfur content of about 0.49 weight percent, a nitrogen content of about 2000 weight p.p.m. and an aromatics content of about 45 liquid volume percent. The charge stock was cut into the first stage reactor and the pilot plant was lined out at the following processing conditions: Pressure throughout the pilot plant—1500 p.s.i.g.; hydrogen circulation—10,000 s.c.f./bbl.; combined feed ratio in first reactor—1.0; combined feed ratio in second reactor—2.0. The temperatures in the first reactor were increased to about 710° F. and the temperatures in the second stage were adjusted to produce a 400° F. end point gasoline total liquid product withdrawn from the plant. A series of tests were run in which weight balances were made to evaluate the yield and quality of the products produced from the pilot plants. Column 1 of Table 2 shows the results of an average of 10 tests and represent the performance expected using Catalyst A as a hydrocracking catalyst.

Another run was made using the charge stock hereinabove described. Catalyst B was loaded in the second stage reactor. All other conditions were maintained the same as those used in the run hereinabove. Column 2 of Table 2 shows the results of an average of 8 tests and represent the performance expected using Catalyst B as a hydrocracking catalyst.

TABLE 2

|  | Column 1 | Column 2 |
|---|---|---|
| Catalyst in Second Stage | A | B |
| Operating conditions: |  |  |
| Pressure, p.s.i.g | 1,500 | 1,500 |
| H₂ circulation, s.c.f./bbl | 10,000 | 10,000 |
| LHSV, first stage | 2.0 | 2.0 |
| LHSV, second stage | 0.5 | 0.5 |
| CFR, first stage | 1.0 | 1.0 |
| CFR, second stage | 2.0 | 2.0 |
| Processing results: |  |  |
| First stage peak temperature, °F | 709 | 710 |
| Second stage peak temperature, °F | 742 | 736 |
| Hydrogen consumption second stage, s.c.f./bbl | 1830 | 1925 |
| Product: |  |  |
| Product °API at 60° F | 56 | 54 |
| C₇+ aromatics, LV percent | 30 | 29 |
| Yields and octanes: |  |  |
| C₁-C₃, s.c.f./bbl | 122.1 | 130.3 |
| C₄ LV percent | 16.0 | 18.8 |
| C₅ LV percent | 12.0 | 14.2 |
| C₆ LV percent | 12.5 | 14.0 |
| C₇, 400° F., LV percent | 77.0 | 72.2 |
| F, 1 Clear Octane No | 79.5 | 77.0 |

Since the object of this run is to convert the above described charge stock into maximum gasoline for use as a motor fuel, a comparison of the results shown in Table 2 show that Catalyst A is superior to Catalyst B in carrying out that objective. It should be noted that Catalyst B has produced more light hydrocarbons (methane, ethane and propane) than has Catalyst A (130.3 vs. 122.1 s.c.f./bbl.). Since these light hydrocarbons are too volatile to be used as a motor fuel, they represent a loss in gasoline yield thus showing an advantage for Catalyst A. It also requires more hydrogen to produce excess light hydrocarbon which accounts for (at least in part) the excess hydrogen consumption for Catalyst B over Catalyst A. This again is an advantage for Catalyst A since hydrogen is expensive as well as the cost to compress hydrogen to plant pressure. The normal gasoline boiling range is from about C₅ to about 400° F. end point material. The yield of this gasoline for Catalyst A is 101.5 LV% of feed whereas only 100.4 LV% for Catalyst B. Furthermore, the yield of C₅ and C₆ components in the gasoline from Catalyst B is higher than the gasoline from Catalyst A and since these components also have significant volatility, it will not be possible to add as much butane thereto for vapor pressure purposes as for the gasoline produced from Catalyst A. This means that the yield of finished gasoline (including butane) will be even higher for the gasoline produced from Catalyst A over the gasoline produced from Catalyst B. Finally, the F-1 Clear Octane Number is 2.5 numbers higher for the gasoline produced from Catalyst A over that produced from Catalyst B, a very significant advantage for Catalyst A. Therefore, it becomes apparent that more gasoline having a higher F-1 clear octane is produced using the Type O supported hydrocracking catalyst than a pure faujasite supported hydrocracking catalyst.

EXAMPLE III

This example is presented to illustrate another method for the production of Type O crystalline aluminosilicate. A pure faujasite powder having a silica/alumina mole ratio of about 4.9/1 is soaked in an excess of a sodium silicate solution having approximately 10 moles of $$(Na_2O)_{0.4}SiO_2$$

per liter. The volume of each large supercage in the faujasite structure is about 800 cubic angstroms and the amount of solution and powder are selected to distribute about 5 molecules of $(Na_2O)_{0.4}SiO_2$ per supercage. The excess liquid is removed by filtration and the faujasite containing the sodium silicate is exposed to an excess carbon dioxide atmosphere to form sodium carbonate and precipitate colloidal $SiO_2 \cdot xH_2O$. Because of the cage structure of the faujasite, the atoms of $SiO_2$ in each part of the cage structure are precipitated essentially independently of each other. This product is then washed to remove excess sodium carbonate and calcined at about 900° F. to dehydrate the $SiO_2$ in situ. Analysis of the calcined material reveals the $SiO_2$ within the cage structure of the faujasite is crystallographically significant in that it produces selective intensity change in the faujasite diffraction lines. Simple dilution or contamination with silica would be expected to decrease all of the intensities by the same factor.

EXAMPLE IV

This example is presented to illustrate the improved temperature sensitivity and therefore ease of control of a hydrocracking process using a Type O support catalyst when compared to "pure" faujasite support. A Type O supported hydrocracking catalyst prepared as described in Example I was loaded into the pilot plant described in Example II. The fresh feed was pumped into the plant at a constant rate and the heavier than 400° F. boiling point material effluent from the second stage reactor was recycled to a graduated inventory vessel. This recycled material was pumped at a constant rate therefrom back to the second stage reactor. The second stage reactor temperature was controlled by the level of recycled material in the vessel. If the level of inventory increased, the automatic controller increased the temperature of the second stage reactor which caused greater conversion and this acted to reduce inventory. A catalyst having a large temperature sensitivity that is a large change in conversion for a small temperature change will cause wide fluctuations in conversion when controlled in the above manner. Likewise, any other control system containing a highly temperature sensitive catalyst makes smooth operations very difficult. With the above control system, temperature sensitivity of the catalyst is measured by the conversion over a given time period. Conversion is herein defined by the following formula:

Percent conversion = 100

$$-100 \left( \frac{\text{change in vessel inventory}}{\text{charge volume during time period for inventory increase}} \right)$$

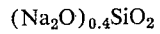

The calculated daily conversion percentages during a 16 day period obtained simultaneously with the tabulated data in Example II using the Type O supported catalyst A are as follows: 99.5, 99.0, 100.5, 101, 101, 100.5, 99.3, 100.6, 101, 102 [a], 100.2, 101, 101, 100.2, 100.2, 98.8. A similar daily conversion percentage during an 18 day period was tabulated for a "pure" faujasite support hydrocracking catalyst B used in the second stage reactor and obtained simultaneously with the tabulated data in Example II are as follows: 98.5, 101.0, 98.5, 102, 98.5, 104.0, 97.5, 100.0, 97.0, 100.8, 103.5, 96.5, 99.0, 103.0, 97.5,

[a] A plant upset occurred between these points.

102.7, 97.7, 99.9. Careful comparison of the conversion percentages for Catalyst A with Catalyst B shows that Catalyst A is less temperature sensitive and therefore a more satisfactory commercial catalyst.

We claim as our invention:

1. A synthetic composition comprising a host crystalline aluminosilicate having three dimensional cages and periodically dispersed silica contained within the cages having the following molar ratio chemical composition:

$$0.9 \pm 0.3 M_2O/n : Al_2O_3 : xSiO_2 : yH_2O$$

wherein M is a cation, $n$ is the valence of M, $x$ is a number from about 4 to about 11 and $y$ is a number less than about 5, there being from about 1 to about 10 molecules of dispersed silica per cage.

2. The composition of claim 1 further characterized in that $x$ is a number of from about 4.5 to about 7.0.

3. The composition of claim 2 further characterized in that the host crystalline aluminosilicate comprises faujasite and the composition has an X-ray powder diffraction pattern substantially that shown in column 2 of Table I and $x$ is a number from about 4.7 to about 6.2.

4. The composition of claim 3 further characterized in that the X-ray powder diffraction pattern shown in column 2 of $x$ has a value of 6.1.

5. A method for the manufacture of the compositions of claim 1 wherein M is sodium, which comprises: preparing an aqueous slurry of silica and a solution of sodium aluminate and sodium hydroxide; mixing the slurry and solution together in such ratios that the overall mixture has about the following mole ratios:

$$SiO_2/Al_2O_3 = 10, \ Na_2O/SiO_2 = 0.41 \text{ and } H_2O/Na_2O = 40$$

aging and agitating the mixture; heating the mixture to an elevated temperature and aging the mixture quiescently; agitating the resulting mixture and cooling the mixture; separating the solids in admixture with a portion of the surrounding liquid from the remaining liquid; slurrying the solids, without water washing thereof, and said portion of liquid in water to produce a slurry; spray drying the slurry into a hot zone containing carbon dioxide and maintained at from about 500° F. to about 950° F. to produce spray dried particles; water washing the spray dried particles and drying the water washed spray dried particles.

6. A method of preparing a hydrocracking catalyst which comprises: blending a powdered composition of claim 1 with a temporary binder; pilling the powder and binder into pills of desired size and shape; calcining the pills to burn out binder; ion exchanging the calcined pills with at least one aqueous solution to reduce the sodium content of the pills; and depositing a Group VIII metal or metal compound on the pills.

7. A substantially binderless hydrocracking catalyst which comprises: a support comprising a host crystalline aluminosilicate having three dimensional cages and periodically dispersed silica contained within the cages having the following molar ratio chemical composition:

$$0.9 \pm 0.3 M_2O/n : Al_2O_3 : xSiO_2 : yH_2O$$

wherein M is a cation, $n$ is the valence of M, $x$ is a number from about 4 to about 11 and $y$ is a number less than about 5, there being from about 1 to about 10 molecules of dispersed silica per cage; and a Group VIII metal or metal compound deposited on said support.

8. The catalyst of claim 7 further characterized in that the crystalline aluminosilicate comprises faujasite.

9. The catalyst of claim 8 further characterized in that the Group VIII metal or metal compound comprises nickel.

10. A process for the hydrocracking of hydrocarbons which comprises contacting said hydrocarbons along with hydrogen with the hydrocracking catalyst of claim 7 under hydrocracking conditions.

11. The process of claim 10 further characterized in that M is sodium, calcium, magnesium or hydrogen, and said host crystalline aluminosilicate is faujasite.

References Cited

UNITED STATES PATENTS

| | | | |
|---|---|---|---|
| 2,848,346 | 8/1958 | Bertorelli | 23—113 X |
| 3,066,092 | 11/1962 | Winyall | 252—453 X |
| 3,275,571 | 9/1966 | Mattox | 252—453 X |

PATRICK P. GARVIN, Primary Examiner

C. F. DEES, Assistant Examiner

U.S. Cl. X.R.

23—113; 252—453